United States Patent

Yamashita et al.

[11] Patent Number: 4,910,968
[45] Date of Patent: Mar. 27, 1990

[54] REFRIGERATING APPARATUS

[75] Inventors: Tetsuji Yamashita, Shizuoka; Hideo Takemoto, Tokyo; Tomio Yoshikawa, Shimizu; Shizuo Zushi, Hadano; Kenji Takahashi, Abiko, all of Japan

[73] Assignee: Hitachi, Ltd., Tokyo, Japan

[21] Appl. No.: 345,839

[22] Filed: May 1, 1989

[30] Foreign Application Priority Data

May 11, 1988 [JP] Japan .................. 63-112456

[51] Int. Cl.$^4$ .............................................. F25B 1/00
[52] U.S. Cl. ........................................ 62/204; 62/227; 62/228.4
[58] Field of Search ................. 62/228.4, 227, 204–217

[56] References Cited

FOREIGN PATENT DOCUMENTS 57-148864  4/1984  Japan .
61-285349 12/1986  Japan .
62-52367   3/1987  Japan .
0194148    8/1987  Japan .................... 62/227
0074447    4/1989  Japan .................... 62/227

Primary Examiner—William E. Wayner
Attorney, Agent, or Firm—Antonelli, Terry & Wands

[57] ABSTRACT

A refrigerating apparatus has a refrigerating cycle including an electromotive compressor whose operational speed is variable in accordance with a drive frequency, and a control unit for operating the compressor at a frequency correspondent to a load so as to control the operation of the refrigerating cycle. Control of the operational frequency of the compressor by the control unit is effected on the basis of target super heat amounts of a discharged gas which is predetermined over an operational frequency range of the compressor. The target super heat amounts are set such that within a lower region of the operational frequency range, each target amount is larger than a super heat amount at which the maximum refrigeration capability is obtained at each operational frequency, so as to suppress a suction pressure of the compressor within an allowable limit for the compressor.

8 Claims, 6 Drawing Sheets

REFRIGERATING APPARATUS

BACKGROUND OF THE INVENTION

The present invention relates to a refrigerating apparatus, and more particularly to a refrigerating apparatus that performs a control of refrigerating capability for use in an air-conditioning system or the like.

In recent years, there is a tendency that a refrigerating apparatus having an electromotive compressor variable in operation speed by means of an inverter and an electromotive expansion value is employed in such an equipment as an air conditioning system or the like. This refrigerating apparatus is adapted to change the amount of a refrigerant flowing through the refrigeration cycle by controlling, the operational speed of the compressor and/or the valve opening degree of the expansion valve, and can more finely control its refrigeration capability in comparison with conventional refrigerating apparatuses.

The refrigerating apparatus of such type is disclosed in, for example, Japanese Utility Model Unexamined Publication No. 59-52359, Japanese Patent Unexamined Publication No. 61-285349 and Japanese Patent Unexamined Publication No. 62-52367.

Japanese publication No. 59-25359 proposes the refrigerating apparatus in which whenever the apparatus is started to operate, the electromotive expansion valve is once set to a predetermined valve opening degree for starting the operation, and thereafter, the opening degree of the expansion valve is adjusted in response to an operational or driving frequency of the compressor. In Japanese publication No. 61-285349, there is shown the refrigerating apparatus in which a driving frequency of the compressor is changed within an operational range except when the compressor is operated at a minimum operational frequency, and the opening degree of the electromotive expansion valve is changed when the compressor is operated at the minimum frequency, so as to change the refrigeration capability. Japanese publication No. 62-52367 discloses the refrigerating apparatus in which a valve opening degree of the variable capacity type expansion valve is changed in response to an operational frequency of the compressor to thereby regulate a suction pressure of the compressor.

Any one of the above-described apparatuses would contribute toward improving the controllability of the refrigeration cycle or enlarging the variable range of the refrigeration capability thereof. However, for instance, in order to use the refrigerating apparatus in an air-conditioning system and perform more comfortable air-conditioning, it is desirable to more increase the variable range of the refrigeration capability of the apparatus by increasing the operational range thereof while enabling the apparatus to operate in a stable and continuous manner.

SUMMARY OF THE INVENTION

The present invention has an object of providing a refrigerating apparatus which is capable of widely changing the refrigeration capability and being readily controlled.

Another object of the invention is to provide a refrigerating apparatus which can perform a stable and continuous operation over a wide operational range.

For the above ends, the present invention aims at controlling the operation of a refrigerating apparatus on the basis of a super heat amount of a discharged refrigerant gas, thereby enabling the apparatus to accommodate in refrigeration capability to a much smaller load without changing a minimum frequency at which an electromotive compressor can be operated.

According to one aspect of the invention, there is provided a refrigerating apparatus which comprises a refrigeration cycle having an electromotive compressor whose operational speed is variable in accordance with a drive frequency, and a control unit for operating the compressor at a frequency in response to a load so as to control the operation of the refrigeration cycle. Control of the operational frequency of the compressor by the control unit is performed on the basis of target super heat amounts of a discharged gas which amounts are predetermined over a operational frequency range of the compressor, and the target super heat amounts of the discharge gas are set such that within a low region of the operational frequency range, each target amount is larger than a super heat amount of the discharged gas at which a maximum refrigeration capability is obtained at each operational frequency, so as to suppress a suction pressure of the compressor within an allowable critical level for the compressor.

BRIEF DESCRIPTION OF THE DRAWINGS

The above-described and other objects, features and advantages of the invention will become more apparent from the following description and appended chain when considered in conjunction with accompanying drawings.

In the accompanying drawings.

DETAILED DESCRIPTION OF THE PREFERRED EMBODIMENTS

The present invention will now be described with reference to the embodiments thereof shown in the accompanying drawings.

Figure 1:
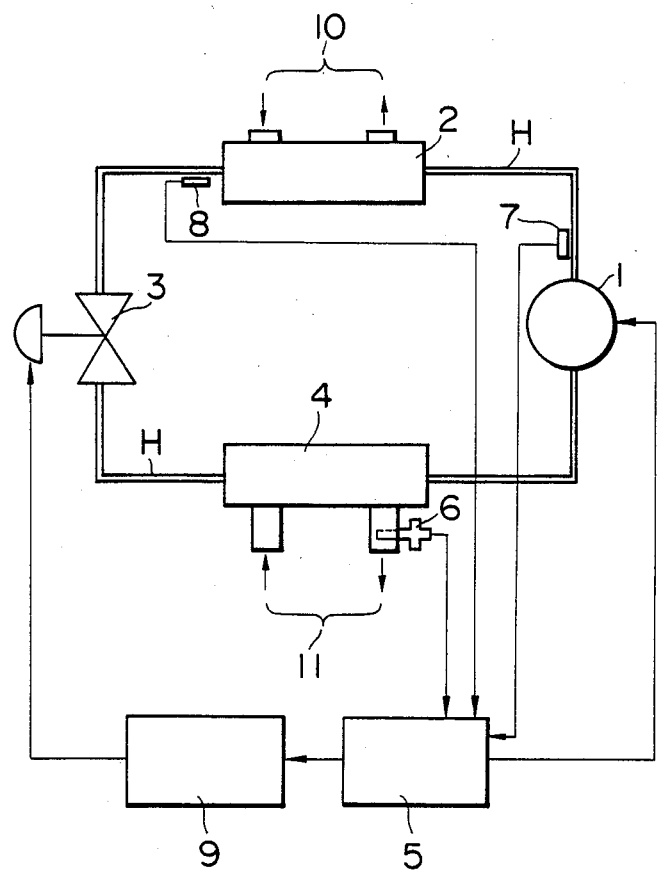
FIG. 1 is a schematic view showing the overall refrigerating apparatus in accordance with an embodiment of the invention.

Referring to FIG. 1, the refrigerating apparatus in accordance with an embodiment of the invention comprises an electromotive compressor 1, a condensor 2, an expansion valve 3 and an evaporator 4. These components are connected through a pipe passage H to form a refrigeration cycle for recirculating a refrigerant. The refrigerating apparatus is provided with a control unit 5 for control the operation of the refrigeration cycle. Further provided are a temperature sensor 6 at a cooling water outlet of the evaporator 4, a discharge gas temperature sensor 7 at an outlet of the compressor 1, and a condensation temperature sensor 8 at a refrigerant outlet of the condensor 2, and these sensors are connected to the control unit 5.

An inverter (not shown) is incorporated in the compressor 1 so that the operational speed thereof can be varied by changing the frequency of a drive electric power, thereby changing a discharge displacement or capacity of the compressor 1. The control unit 5 is connected to the compressor 1 to control the operation of the compressor 1. An electronic driving device 9 is connected to the expansion valve 3 so as to drive the latter in accordance with an output signal of the control unit 5. Reference numeral 10 denotes inlet and outlet ports for cooling water of the condensor 2, and numeral 11 denotes inlet and outlet ports 11 for cooling water (loads) of the evaporator 4. The above-described components except for the control unit 5 may be of conventional components. Also, the refrigeration operation of the cycle itself may be the same as the conventional one. Therefore, a further explanation therefor will be omitted.

The control unit 5 includes an input section for receiving data, a calculating section for performing a calculation on the basis of the input data and an output section for outputting the results of the calculation. Inputted into the input section are the information from the water temperature sensor 6, the discharge gas temperature sensor 7 and the condensation temperature sensor 8, and the other information of the operational frequency at that time. Also, the calculating section is adapted to store a predetermined operation frequency range of the compressor and pre-set values of super heat amounts of a discharge gas and to calculate an actual discharge gas super heat amount in the refrigeration cycle on the basis of the data from the input section, thereby compare it with the preset values. A signal representative of the resultant comparison calculation is outputted from the output section to the compressor 1 or the driving device 9.

The operation of the above-described refrigerating apparatus will be explained. When the refrigerating apparatus is started, the temperature information of the cooling water from the sensor 6, which is representative of the load is inputted into the control unit 5. The control unit 5 performs the calculation on the basis of this information to operate the compressor 1 at a predetermined frequency in response to the load at this time. As a result, a cycle operation of compression, condensation, expansion and evaporation of the refrigerant is started. When the refrigeration cycle starts working, the control unit 5 detects the condition of the refrigeration cycle through the information from the discharge gas temperature sensor 7 and the condensation temperature sensor 8. Namely, the control unit 5 calculates the amount of super heating of the discharge gas from a difference between the refrigerant discharge temperature and the condensation temperature and verify whether or not the calculation value falls within a tolerance range of the pre-set value. When the calculation value does not fall within the range, the control unit 5 feeds an output signal to the electronic driving device 9 to control the valve opening degree of the expansion valve 3 through the driving device 9 so that the discharge gas super heat amount of the refrigeration cycle comes to be identical with the pre-set value. Thus, the operation of the refrigeration cycle becomes stable and a series of these control steps is always performed at a sampling interval during the operation of the refrigeration cycle.

Subsequently, referring to FIG. 2, the control of the discharge gas super heat amount in the refrigerating apparatus according to the invention will now be described.

Figure 2:
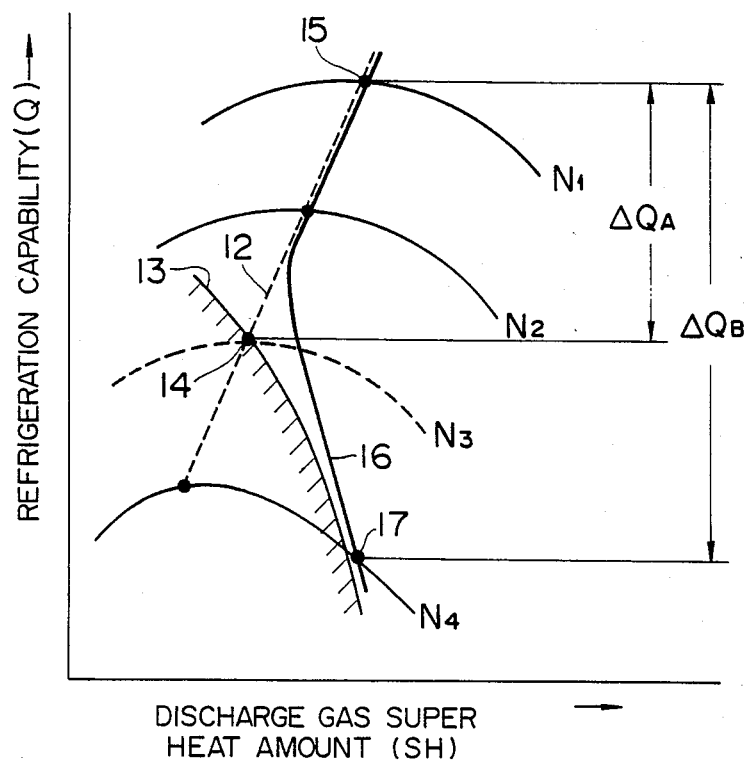
FIG. 2 is a diagram illustrating an operational control of the refrigerating apparatus shown in FIG. 1.

The abscissa axis in FIG. 2 represents a discharge gas super heat amount SH and the ordinate axis represents a refrigeration capability Q of the refrigeration cycle. In FIG. 2, the operational frequency curves of the compressor 1 are represented by N1, N2, N3 and N4, which have a relationship $N1 > N2 > N3 > N4$. It is apparent from FIG. 2 that there is a difference in refrigeration capacity Q due to the difference in super heat amount of the discharge gas even in the same frequency. In FIG. 2, the dotted line 12 represents a control line for discharge gas super heat generally in use, which is in the form of bringing out the maximum refrigeration capability at each frequency. A curve 13 represents an isobaric line of the compressor suction pressure. Hatching in FIG. 2 represents the region beyond the permissible upper limit of a suction pressure of the compressor.

In the case where the control line of the discharge gas super heat represented by dotted line 12 is employed, the minimum driving frequency that does not exceed the permissible suction pressure limit of the compressor is represented by a point 14 on the curve N3. This means that the allowable range within which the compressor may operate is above the point 14, and the variable amount of the refrigeration capability is represented by a distance $\Delta QA$ between a point 15 on the maximum frequency curve N1 and the point 14.

On the other hand, in the foregoing embodiment of the invention, the control curve designated by numeral 16 is employed and is set in the control unit 5. This control curve is formed by smoothly connecting a half part of the dotted line 12 in the high operational frequency range and a line which extends substantially along the curve 13 not to exceed the permissible suction pressure limit of the compressor in the low operational frequency range. The control curve 16 has to be formed in a shape of following the curve 12 and the curve 13 as much as possible in order to bring out the largest refrigeration capability within the permissible suction pressure limit at each driving frequency. But, on the other hand, it is preferable to suppress the curvature of the control curve 16 as much as possible in view of the smoothness of control. According to the control line 16, the minimum operational frequency of the compressor is decreased to a point 17 on the curve N4. As a result, the change amount of the refrigeration capability comes to be a distance $\Delta QB$ between the points 15 and 17. Thus, it is possible to considerably increase the operational range of the refrigerating apparatus in comparison with the above-described amount $\Delta QA$.

Figure 3:
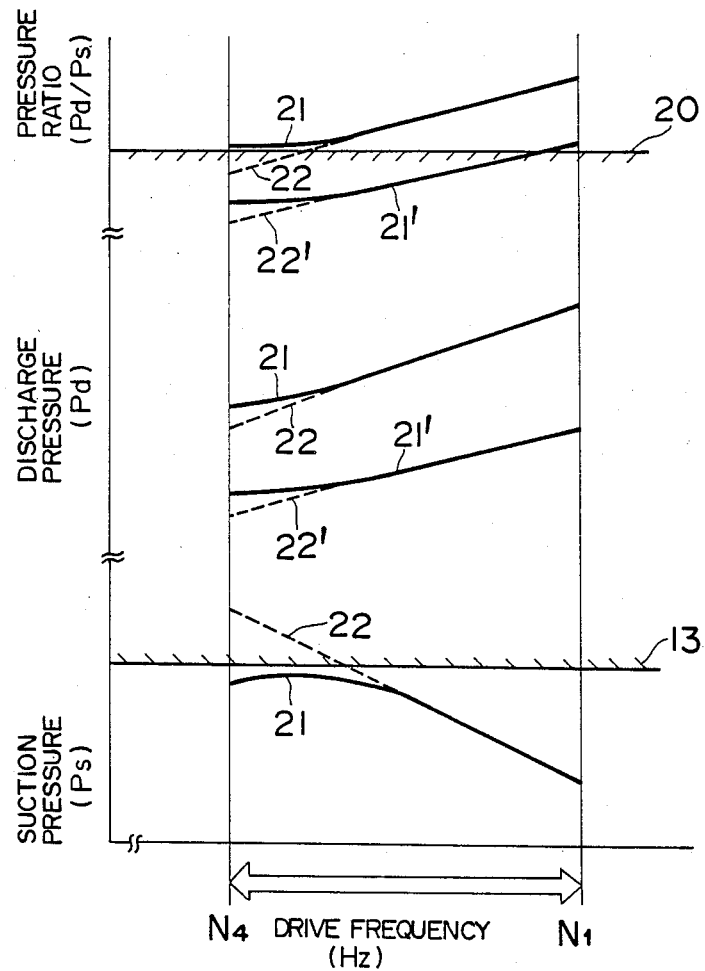
FIG. 3 is a graph showing a relationship between a suction pressure and a discharge pressure of a compressor used in the refrigerating apparatus shown in FIG. 1.

FIG. 3 shows an operational pressure of the refrigerating apparatus according to the invention. In the foregoing description, the operational limit of the compressor in terms of the suction pressure has been explained, but pressure ratio will now be additionally explained.

In FIG. 3, the abscissa axis shows an operational frequency Hz, and the operational range is represented by N1 to N4. Also, the ordinate axis denotes a suction pressure Ps, a discharge pressure Pd and a pressure ratio Pd/Ps. Reference numeral 13 denotes a corresponding limit line for the compressure suction pressure to the limit curve shown in FIG. 2, and numeral 20 denotes a limit line for the pressure ratio. Hatching in FIG. 3 denotes regions beyond the permissible operational limits. A curve 21 shows an operation condition under the control by the present invention. It will be understood that, since the control is effected to avoid crossing the limit line of the suction pressure on the lower side of the operational frequency range, the refrigerating apparatus may be operated without exceeding also the pressure ratio limit. On the other hand, a curve 22 shows a operation condition under the control by the above-described general control line.

Incidentally, when the refrigerating apparatus is operated through a year, there would be cases where the discharge pressure Pd and the pressure ratio Pd/Ps are generally lowered as indicated by curves 21' and 22' due to the change of environmental conditions such as an atmospheric temperature. For this reason, it is preferable to provide a value for adjusting condensation pressure in the case of an air-cooling type refrigerating apparatus and to provide a water regulator valve in the case of a water cooling type refrigerating apparatus, thereby adjusting the condensation of the refrigerant to keep the pressure ratio at a desired level.

Figure 4:
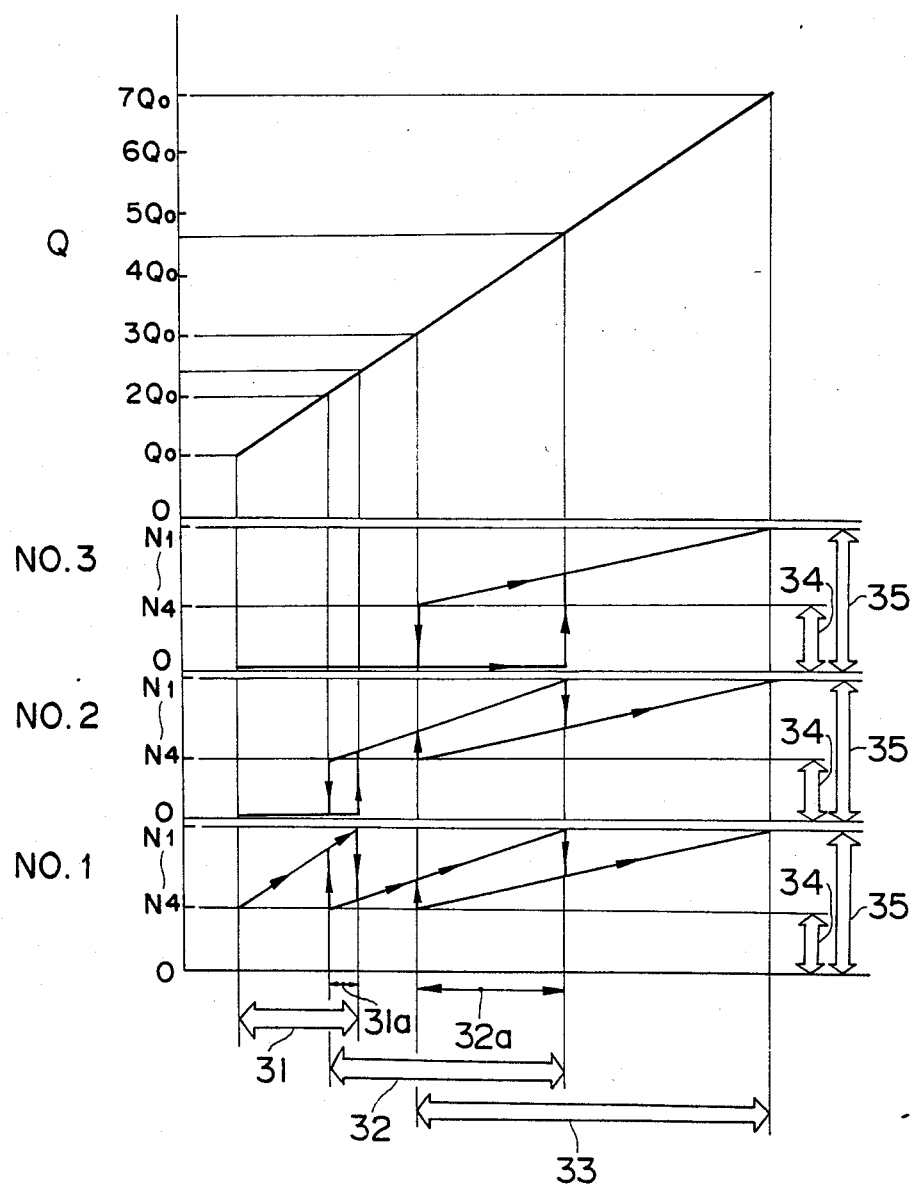
FIG. 4 is a graph illustrating an operation of a system into which incorporated are a plurality of refrigerating apparatuses one of which is shown in FIG. 1.

A control condition of a system into which incorporated are a plurality of refrigerating apparatuses each of which is structured in accordance with the foregoing embodiment will now be described with reference to FIG. 4. In this example, the three refrigerating apparatuses No. 1 to No. 3 are incorporated, and each refrigerating apparatus is operated at the frequency range N1 to N4. The lower portion of the graph in FIG. 4 shows the operational condition of each refrigerating apparatus, and the upper portion of the graph shows a change in refrigeration capability of the overall system. In FIG. 4, reference numerals 31 to 33 denote control steps for the number of the refrigerating apparatuses in operation within the refrigeration capability variable range, numeral 31 denoting the case where the single refrigerating apparatus is operating, 32 denoting the case where the two refrigerating apparatuses are operating, and 33 denoting the case where all the three refrigerating apparatuses are operating, respectively.

In this system, the control unit is set so that the minimum refrigeration capability 34 at the frequency N4 of each refrigerating apparatus is less than about half the maximum refrigeration capability 35 at the frequency N1. The system is adapted to cope with an increase or decrease of the load by increasing or decreasing the number of the operating refrigerating apparatuses in the same manner as in the conventional system of this type. However, by setting the minimum refrigeration capability of each refrigerating apparatus as described above, it is possible to provide operation portions 31a and 32a in which a former and a subsequent step for controlling the number of operating apparatuses are overlapped to each other, when the number of the operative refrigerating apparatuses is increased or decreased, as shown in FIG. 4. As a result, it is possible to provide an extra period for observing the responsive condition in refrigeration capability of the system to the control to determine the number of the operative refrigerating apparatuses when the refrigeration capability is increased or decreased, thereby avoiding frequently turning on and turning off each refrigerating apparatus.

Figure 5:
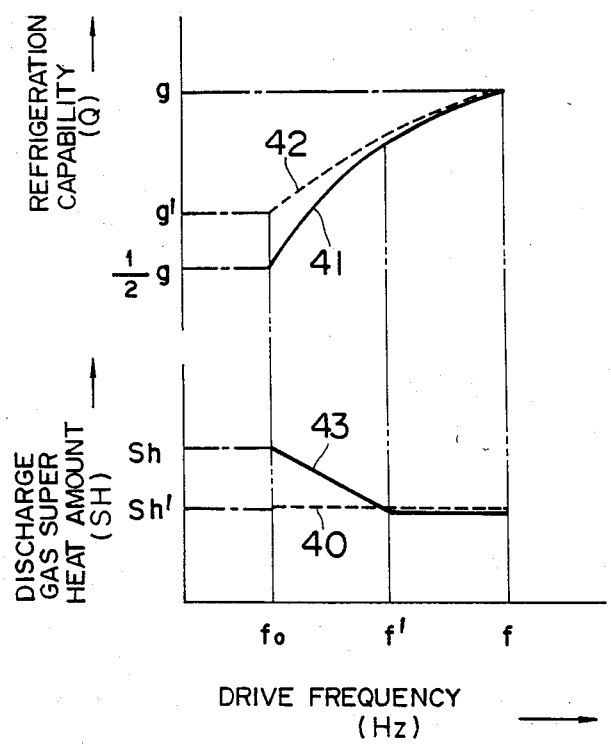
FIG. 5 is a graph illustrating the setting of a minimum refrigeration capability of each refrigerating apparatus in the system shown in FIG. 4.

The minimum refrigeration capability of each refrigerating apparatus will now be further described. FIG. 5 shows the relationship in control of the refrigeration capability Q and the discharge gas super heat amount 5H with respect to the operational frequency Hz of the compressor. The compressor is operated at, for example, a frequency f' between the minimum frequency fo and the maximum frequency f in response to a refrigeration load. In FIG. 5, a dotted line 42 represents the refrigeration capability characteristic in the case where the refrigeration cycle is controlled in accordance with a substantially constant amount sh' of discharge gas super heat as indicated by a dotted line 40. In this case, the responsible width of the change of the refrigeration capability is represented by q-q'. On the other hand, according to the present invention, by controlling the discharge gas super heat amount as described above, the operative range of the refrigerating apparatus may be widened. For this reason, the discharge gas super heat amount is increased to a level sh as indicated by a solid line 43, so that the refrigeration capability at the minimum frequency fo is about half the maximum refrigeration capability q. As a result, the refrigeration capability is changed as indicated by a solid line 41, so that it is possible to broaden the width of change of the refrigeration capability up to q-($\frac{1}{2}$)q. When this controlling is employed, it is possible to change the sum of the refrigeration capability continuously up to ($\frac{1}{2}$)q-3q in the combined system of the plurality of refrigerating apparatuses as described later in conjunction with FIG. 6.

Figure 6:
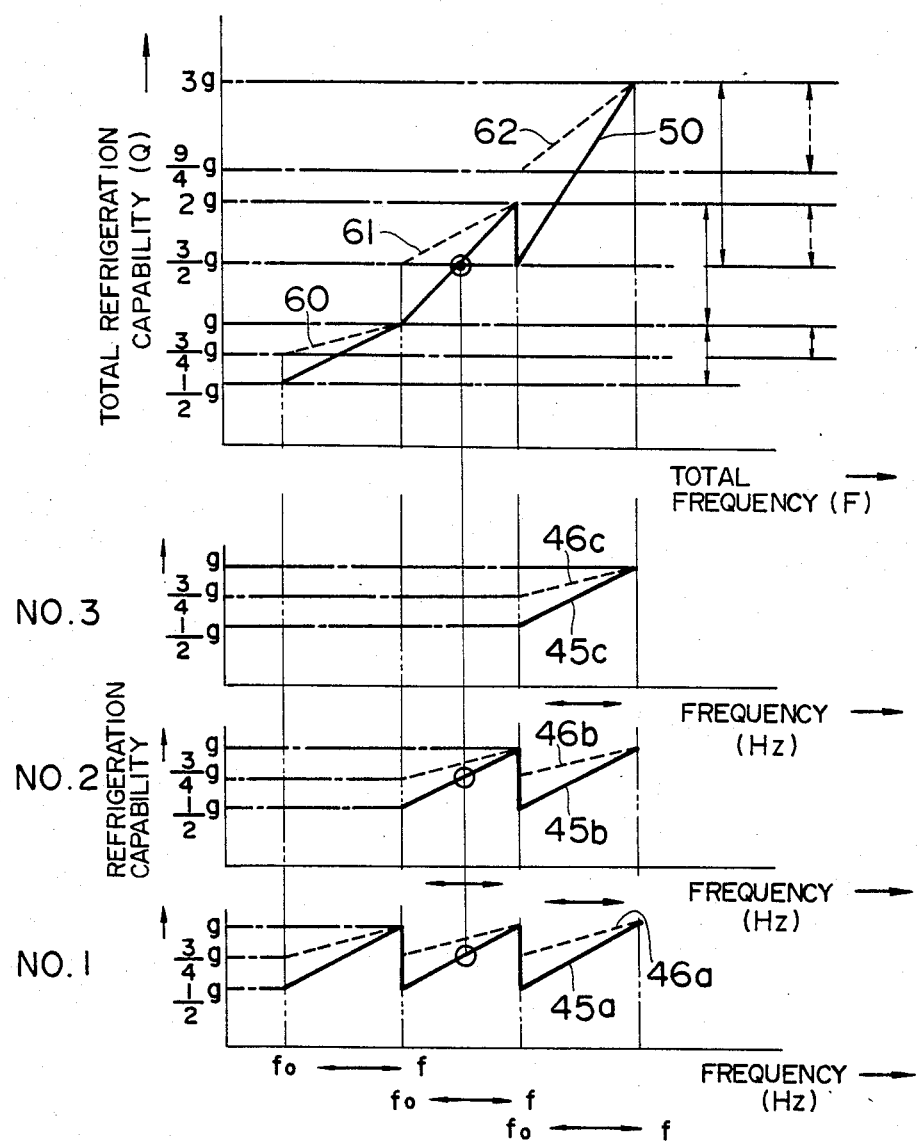
FIG. 6 is a graph showing the operational condition of the system shown in FIG. 4, in comparison with a conventional system.

Referring to FIG. 6, in the system provided with the plurality of refrigerating apparatuses according to the invention, the operational modes of the refrigerating apparatuses No. 1, No. 2 and No. 3 are designated by reference characters 45a, 45b and 45c. Also, reference numerals 46a, 46b and 46c represent the operational modes No. 1, No. 2 and No. 3 refrigerating apparatuses of a conventional system.

In FIG. 6, the variable ranges of the refrigeration capability of the respective refrigerating apparatuses in the conventional system are represented by ($\frac{3}{4}$)q-q, (3/2)q-2q and (9/4)q-3q as indicated by dotted lines 60, 61 and 62. Accordingly, the refrigeration capability of the system is discontinuous between ($\frac{1}{2}$)q-($\frac{3}{4}$)q, q-(3/2)q and 2q-(9/4)q, and in these discontinuous regions, the control of turning on or turning off the compressor is frequently performed in order to cope with a demand load, resulting in reduction of the service life of the apparatus.

In contrast to the above-described operation of the conventional system, according to the present invention, it is possible to keep the operational range of the system continuous and to bring out the refrigeration capability without frequency turning on and turning off the compressors. More specifically, when the three refrigerating apparatuses each of which is controlled in accordance with the invention are applied to the system, each refrigerating apparatus exhibits the maximum refrigeration capability q at the maximum operative frequency f and the capability which is about half the maximum refrigeration capability at the minimum operative frequency fo. Accordingly, should the necessary refrigeration capability for response to a demand load be allotted equally to the respective refrigerating apparatuses, the total frequency F for the refrigeration system comes to range from fo to 3f, and the total refrigeration capability is by ($\frac{1}{2}$)q-3q. Thus, according to the present invention, it is possible to operate the system in a continuous and stable manner as indicated by a solid line 50 in FIG. 6.

Incidentally, in the foregoing embodiment, the expansion valve is controlled to operate the compressor within the permissible limit for the suction pressure.

Figure 7:
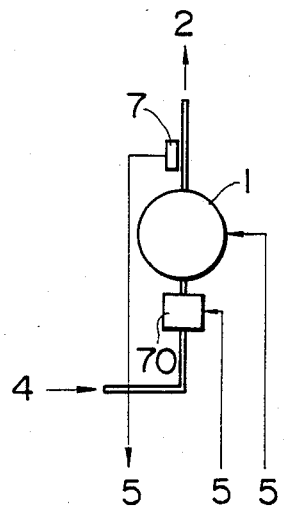
FIG. 7 is a schematic view showing an essential part of the refrigerating apparatus in accordance with another embodiment of the invention.

Alternatively, a valve 70 for adjusting the suction pressure that is adapted to be continuously controlled in linkage to the control of the compressor by means of the inverter may be provided in the midway of the suction pipe passage of the compressor 1 as shown in FIG. 7, thereby preventing the increase of the suction pressure. In this modification, the pressure adjusting valve 70 is controlled such that the discharge gas super heat amount of the refrigeration cycle conforms with the control line 16 in FIG. 2.

Furthermore, instead of the expansion valve, a plurality of capillary tubes may be utilized as a simplified expansion means, so that the capillary tube or tubes having a suitable capacity are selectively used at each operative frequency.

As described above, according to the present invention, it is possible to broaden the variable range of the refrigeration capability of the refrigeration apparatus without exceeding the upper limit of the suction pressure of the compressor and to increase the operative range of the apparatus. Also, in the system provided with a plurality of refrigerating apparatus, the operation of each refrigerating apparatus is controlled in terms of the super heat amount of the discharge gas so that, at the minimum operative frequency, the refrigerating apparatus may have a refrigeration capability that is about half the maximum refrigeration capability at the maximum operational frequency, whereby it is possible to broaden the variable range of the refrigeration capability responsible to a demand load.

As a result, without unduly lowering the lower limit of the operative frequency of the compressor, in general which is equivalent to the lower limit of the allowable control amount, it is possible to broaden the operative range of the refrigerating apparatus in a continuous and smooth manner up to the lower refrigeration capability region. Also, it is possible to prevent an excessive increase of the suction pressure or the pressure ratio of the compressor and to provide the refrigeration apparatus stable in operation.

Although the present invention has been explained on the basis of the specific embodiments, it should be noted that the invention is not limited solely thereto various modifications may be made other forms may be taken within the scope of appended claims.

What is claimed is:

1. A refrigerating apparatus comprising:
   a refrigerating cycle including an electromotive compressor variable in operational speed in accordance with a drive frequency;
   control means for controlling said refrigerating cycle, sand control means operating said compressor at a frequency correspondent to a load, on the basis of target amounts of super heating of a discharged gas, said target amounts being predetermined over an operational frequency range of said compressor; and
   said target amounts of super heating of the discharge gas being set such that within a lower region of the operational frequency range, each target amount is larger than a super heat amount of the discharge gas at which a maximum refrigeration capability is obtained at each operational frequency, so as to suppress a suction pressure of said compressor within an allowable limit for said compressor.

2. The apparatus according to claim 1, wherein a minimum refrigerating capability of said apparatus at a minimum drive frequency in said operational frequency range is set to be less than half the maximum refrigerating capability at a maximum drive frequency.

3. The apparatus according to claim 1, wherein said control means includes a valve for adjusting a suction pressure that is provided on a suction side of said compressor, a valve opening degree of said suction pressure adjusting valve being controlled in linkage to control of the drive frequency of said compressor so as to adjust the suction pressure of said compressor.

4. The apparatus according to claim 3, wherein minimum refrigerating capability of said apparatus at a minimum drive frequency in said operational frequency range is set to be less than half the maximum refrigerating capability at a maximum drive frequency.

5. The apparatus according to claim 1, wherein said refrigerating cycle includes a variable displacement expansion valve, and said control means detects the super heat amount of the discharged refrigerant gas in said refrigerating cycle and compares the thus detected super heat amount with the corresponding target super heat amount of the discharged gas to adjust a valve opening degree of said valve so that the super heat amount of the discharge refrigerant gas of said refrigerating cycle comes to be identical with said target super heat amount.

6. The apparatus according to claim 5, wherein a minimum refrigerating capability of said apparatus at a minimum drive frequency in said operational frequency range is set to be less than half the maximum refrigerating capability at a maximum drive frequency.

7. A refrigerating apparatus comprising:
   a refrigerating cycle formed by an electromotive compressor, a condensor, a variable displacement expansion unit and an evaporator connected in series, said compressor being variable in operational speed in accordance with a drive frequency;
   control means for controlling said refrigerating cycle, said control means operating said compressor at a predetermined frequency correspondent to a load, detecting a super heat amount of a discharge refrigerant gas in said refrigerating cycle and comparing the thus detected amount with target super heat amounts of the discharged refrigerant gas predetermined over an operational frequency range of said compressor to adjust a capacity of said expansion unit so that the super heat amount of discharged refrigerant gas of said refrigerating cycle comes to be identical with a corresponding target super heat amount; and
   said target super heat amounts of the discharged gas being set such that within a lower region of the operational frequency range, each target amount is larger than a super heat amount of the discharge gas at which a maximum refrigeration capability is obtained at each operational frequency, so as to suppress a suction pressure of said compressor within an allowable limit for said compressor.

8. The apparatus according to claim 7, wherein a minimum refrigerating capability of said apparatus at a minimum drive frequency is set to be less than half the maximum drive refrigerating capability at a maximum drive frequency.

* * * * *